United States Patent
Yamazaki et al.

(10) Patent No.: US 9,873,422 B2
(45) Date of Patent: Jan. 23, 2018

(54) DRIVELINE LASH CONTROL METHOD DURING DRIVER TIP-IN/OUT

(71) Applicant: Ford GLobal Technologies, LLC, Dearborn, MI (US)

(72) Inventors: Mark Steven Yamazaki, Canton, MI (US); Bernard D. Nefcy, Novi, MI (US); Marvin Paul Kraska, Dearborn, MI (US); Brandon R. Masterson, Dexter, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 43 days.

(21) Appl. No.: 15/155,240

(22) Filed: May 16, 2016

(65) Prior Publication Data

US 2017/0327102 A1 Nov. 16, 2017

(51) Int. Cl.
*B60W 10/02* (2006.01)
*B60W 10/06* (2006.01)
*B60W 10/08* (2006.01)
*B60W 20/13* (2016.01)
*B60W 20/15* (2016.01)
*F02D 41/02* (2006.01)
(Continued)

(52) U.S. Cl.
CPC ............... *B60W 20/13* (2016.01); *B60K 1/04* (2013.01); *B60K 7/0007* (2013.01); *B60W 10/06* (2013.01); *B60W 10/08* (2013.01); *B60W 20/15* (2016.01); *F02D 41/022* (2013.01); *F02D 41/107* (2013.01); *B60W 2510/0208* (2013.01); *B60W 2510/0233* (2013.01); *B60W 2710/0666* (2013.01); *B60W 2710/081* (2013.01); *B60W 2710/083* (2013.01); *B60W 2710/088* (2013.01); *B60W 2710/244* (2013.01); *B60W 2710/246* (2013.01)

(58) Field of Classification Search
CPC .... B60W 10/02; B60W 10/026; B60W 10/06; B60W 10/08; B60W 2540/10–2540/106; B60W 2510/109; B60W 2710/021; B60W 2710/0605; B60W 2710/0666; B60W 2710/083
See application file for complete search history.

(56) References Cited

U.S. PATENT DOCUMENTS

5,368,120 A 11/1994 Sakai et al.
6,574,535 B1 6/2003 Morris et al.
(Continued)

*Primary Examiner* — Ramya Burgess
*Assistant Examiner* — David Morris
(74) *Attorney, Agent, or Firm* — Brooks Kushman P.C.; David B. Kelley (57) ABSTRACT

A vehicle includes a motor positioned between an engine and a driveline connected to a vehicle wheel, and a controller. The controller controls engine torque and maintains motor torque during wheel torque and driveline component torque reversals to limit a vehicle output torque rate of change through a lash region associated with a range of driveline torque ratios. A method of controlling a hybrid vehicle includes controlling engine torque to a specified profile and maintaining motor torque at a generally constant value during at least one of wheel torque and driveline component torque reversals to limit a vehicle output torque rate of change through a lash region associated with a range of driveline torque ratios.

15 Claims, 8 Drawing Sheets

(51) Int. Cl.
*F02D 41/10* (2006.01)
*B60K 1/04* (2006.01)
*B60K 7/00* (2006.01)

(56) References Cited

U.S. PATENT DOCUMENTS

| | | | |
|---|---|---|---|
| 7,223,203 B2 | 5/2007 | Yamazaki et al. | |
| 7,315,774 B2 | 1/2008 | Morris | |
| 7,577,507 B2 | 8/2009 | Morris | |
| 7,918,763 B2 | 4/2011 | Stoffels et al. | |
| 7,971,667 B2 | 7/2011 | Yamazaki | |
| 8,463,476 B2 | 6/2013 | Ebuchi et al. | |
| 8,911,324 B2 * | 12/2014 | Yamazaki | B60W 10/06 180/65.28 |
| 8,954,215 B2 | 2/2015 | Yamazaki et al. | |
| 8,968,151 B2 * | 3/2015 | Dai | B60K 6/48 477/5 |
| 9,037,329 B2 | 5/2015 | Nefcy et al. | |
| 2007/0225889 A1 * | 9/2007 | Morris | B60K 1/02 701/53 |
| 2011/0039655 A1 | 2/2011 | Kaltenbach et al. | |
| 2013/0296106 A1 * | 11/2013 | Dai | B60K 6/48 477/5 |
| 2013/0297110 A1 * | 11/2013 | Nefcy | B60L 15/20 701/22 |
| 2013/0297111 A1 * | 11/2013 | Yamazaki | B60W 20/00 701/22 |

* cited by examiner

DRIVELINE LASH CONTROL METHOD DURING DRIVER TIP-IN/OUT

TECHNICAL FIELD

Various embodiments relate to a hybrid vehicle and a method of controlling driveline lash for the vehicle.

BACKGROUND

In a vehicle, backlash crossing may occur through the driveline when the wheel torque, or road load torque, and prime mover torque change direction from one another. The driveline may include the transmission gear system, driveline joints, and wheels. Lash, or backlash may occur for example due to lost motion caused by slack or clearance within various driveline components when torque changes direction, such as during a vehicle acceleration or deceleration event. Ignoring the effects of backlash crossing results in a disturbance for the driver.

In a hybrid vehicle, controlling crossing the lash zone in the driveline becomes more complex as there may be more than one prime mover providing torque to a single input shaft of the driveline. Controlling crossing the lash zone in a hybrid is also more complex as the driveline may be in a drive configuration to propel the vehicle or a driven configuration for charging the battery and/or braking. Detecting or predicting operating conditions or zones where driveline lash is likely to occur may be used to mitigate effects of crossing the lash zone.

SUMMARY

In an embodiment, a vehicle is provided with an engine, a traction motor connected to the engine by an upstream clutch, and a driveline connected to a vehicle wheel. The driveline is connected to the traction motor by a downstream clutch. The vehicle has a controller to limit rate of change of the torque applied to the driveline component when the upstream and downstream clutches are locked by controlling engine torque through a region surrounding a torque reversal, control driveline input torque during torque reversal of driveline output torque to limit rate of change of driveline output torque, and control engine torque during a torque reversal of at least one driveline component, the region defined as a function of driveline input torque, driveline output torque, nonproportional driveline losses, and an actual torque ratio across the driveline.

In another embodiment, a vehicle is provided with a motor positioned between an engine and a driveline connected to a vehicle wheel, and a controller. The controller controls engine torque and maintains motor torque during wheel torque and driveline component torque reversals to limit a vehicle output torque rate of change through a lash region associated with a range of driveline torque ratios.

In yet another embodiment, a method of controlling a hybrid vehicle is provided and includes controlling engine torque to a specified profile and maintaining motor torque at a generally constant value during at least one of wheel torque and driveline component torque reversals to limit a vehicle output torque rate of change through a lash region associated with a range of driveline torque ratios.

DETAILED DESCRIPTION

As required, detailed embodiments of the present disclosure are provided herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
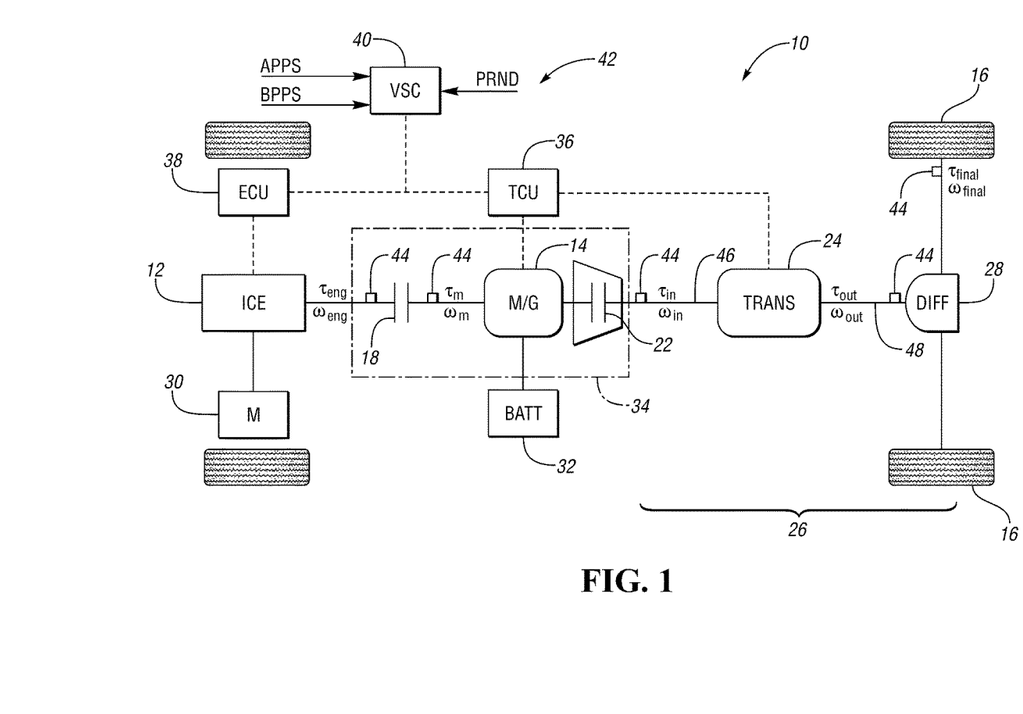
FIG. 1 is a schematic of a hybrid vehicle capable of implementing an embodiment.

FIG. 1 illustrates a schematic diagram of a hybrid vehicle 10 according to an embodiment. The vehicle 10 includes an engine 12, and an electric machine, which, in the embodiment shown in FIG. 1, is a motor generator (M/G) 14, and alternatively may be a traction motor. The M/G 14 is configured to transfer torque to the engine 12 or to the vehicle wheels 16.

The M/G 14 is connected to the engine 12 using a first clutch 18, also known as a disconnect clutch or the upstream clutch. A second clutch 22, also known as a launch clutch or the downstream clutch, connects the M/G 14 to a transmission 24, and all of the input torque to the transmission 24 flows through the launch clutch 22. Although the clutches 18, 22 are described and illustrated as hydraulic clutches, other types of clutches, such as electromechanical clutches may also be used. The clutches 18, 22 may be wet clutches or dry clutches. Alternatively, the clutch 22 may be replaced with a torque converter having a bypass clutch, as described further below. In different embodiments, the downstream clutch 22 refers to various coupling devices for the vehicle 10 including a traditional clutch, and a torque converter having a bypass (lock-out) clutch. This configuration may use an otherwise conventional automatic step-ratio transmission with a torque converter and is sometimes referred to as a modular hybrid transmission configuration.

The engine 12 output shaft is connected to the disconnect clutch 18, which in turn is connected to the input shaft for the M/G 14. The M/G 14 output shaft is connected to the launch clutch 22, which in turn is connected to the transmission 24. The various components of the vehicle 10 are positioned sequentially or in series with one another. The launch clutch 22 connects the vehicle prime movers to the driveline 26, which includes the transmission 24, differential 28, and vehicle wheels 16, and their interconnecting components. In other embodiments, the method described herein may be applied to hybrid vehicles having other system architectures.

In another embodiment of the vehicle 10, the downstream clutch 22 is a bypass clutch with a torque converter. The input from the M/G 14 is the impeller side of the torque converter, and the output from the torque converter to the transmission 24 is the turbine side. The torque converter 22 transfers torque using its fluid coupling, and torque multiplication may occur depending on the amount of slip between the impeller and turbine sides. The bypass or lock-up clutch for the torque converter may be selectively engaged to create a mechanical or frictional connection between the impeller side and the turbine side for direct torque transfer. The bypass clutch may be slipped and/or opened to control the amount of torque transferred through the torque converter. The torque converter may also include a mechanical lockup clutch.

In the vehicle 10, the launch clutch 22 or bypass clutch for the torque converter may be locked to increase fuel efficiency, and may be locked when crossing a lash zone during a tip in or tip out event. The driveability and control of the effect of lash crossing within the driveline depends on the control of the powertrain torque from the engine 12 and/or the electric machine 14. M/G 14 torque may be controlled to a greater accuracy and with a faster response time than engine 12 torque. During an electric-only mode of operation for the vehicle 10, the M/G 14 torque may be controlled when crossing a lash zone. During a hybrid mode of operation of the vehicle with both the engine 12 and M/G 14 operating, the M/G 14 torque and engine 12 torque may be controlled together in order to improve driveability of the vehicle 10 and reduce the effect of lash crossing in the driveline.

In the representative embodiment illustrated, the engine 12 is a direct injection engine. Alternatively, the engine 12 may be another type of engine or prime mover, such as a port injection engine or fuel cell, or use various fuel sources, such as diesel, biofuel, natural gas, hydrogen, or the like. In some embodiments, the vehicle 10 also includes a starter motor 30 operatively connected to the engine 12, for example, through a belt or gear drive. The starter motor 30 may be used to provide torque to start the engine 12 without the addition of torque from the M/G 14, such as for a cold start or some high speed starting events.

The M/G 14 is in communication with a battery 32. The battery 32 may be a high voltage battery. The M/G 14 may be configured to charge the battery 32 in a regeneration mode, for example when vehicle power output exceeds driver demand, through regenerative braking, or the like. The M/G 14 may also be placed in a generator configuration to moderate the amount of engine 12 torque provided to the driveline 26. In one example the battery 32 is configured to connect to an external electric grid, such as for a plug-in hybrid electric vehicle (PHEV) with the capability to recharge the battery from an electric power grid, which supplies energy to an electrical outlet at a charging station. A low voltage battery may also be present to provide power to the starter motor or other vehicle components, or low voltage power may be provided through a DC to DC converter connected to the battery 32.

In some embodiments, the transmission 24 is an automatic transmission and connected to the drive wheels 16 in a conventional manner, and may include a differential 28. The transmission 24 may be a geared transmission, and may be a step ratio transmission or a continuously variable transmission. The vehicle 10 is also provided with a pair of non-driven wheels, however, in alternative embodiments, a transfer case and a second differential can be utilized to positively drive all of the vehicle wheels.

The M/G 14 and the clutches 18, 22 may be located within a motor generator case 34, which may be incorporated into the transmission 24 case, or alternatively, is a separate case within the vehicle 10. The transmission 24 has a gear box to provide various gearing ratios for the vehicle 10. The transmission 24 gearbox may include clutches and planetary gearsets, or other arrangements of clutches and gear trains as are known in the art. In alternative embodiments, the transmission 24 is a continuously variable transmission or automated mechanical transmission. The transmission 24 may be an automatic six speed transmission, other speed automatic transmission, or other gearbox as is known in the art.

The transmission 24 is controlled using a transmission control unit (TCU) 36 or the like to operate on a shift schedule, such as a production shift schedule, that connects and disconnects elements within the gear box to control the gear ratio between the transmission output and transmission input. The gear ratio of the transmission 24 is the ideal torque ratio of the transmission 24. The TCU 36 also acts to control the M/G 14, the clutches 18, 22, and any other components within the motor generator case 34.

An engine control unit (ECU) 38 is configured to control the operation of the engine 12. A vehicle system controller (VSC) 40 transfers data between the TCU 36 and ECU 38 and is also in communication with various vehicle sensors. The control system 42 for the vehicle 10 may include any number of controllers, and may be integrated into a single controller, or have various modules. Some or all of the controllers may be connected by a controller area network (CAN) or other system. The control system 42 may be configured to control operation of the various components of the transmission 24, the motor generator case 34, the starter motor 30 and the engine 12 under any of a number of different conditions, including in a way that minimizes or reduces the effect of lash crossing in the driveline 26 and impact on the driver during tip in or tip out events.

The VSC 40 receives signals indicative of driver demand. An accelerator pedal position sensor (APPS) is in communication with the VSC 40, and provides information related to the accelerator pedal position, or tip in and tip out of the accelerator pedal. Tip in may be used in relation to a request from the driver for more speed, power, and/or torque, while tip out may be used in relation to a request from the driver for less speed, power, and/or torque. The brake pedal position sensor (BPPS) and gear selection (PRND) are also in communication with the VSC 40 to provide information related to driver demand.

Under normal powertrain conditions (no subsystems/components faulted), the VSC 40 interprets the driver's demands (e.g. PRND and acceleration or deceleration demand), and then determines the wheel torque command based on the driver demand and powertrain limits. In addition, the VSC 40 determines when and how much torque each power source needs to provide in order to meet the driver's torque demand and to achieve the operating points (torque and speed) of the engine 12 and M/G 14.

The vehicle 10 may have speed sensors 44 positioned at various locations of the powertrain and driveline 26. The speed sensors 44 provide information to the control system 42 regarding the rotational speed of a shaft in approximately real time, although there may be some lag due to response time, and signal and data processing. In the embodiment shown in FIG. 1, there is a speed sensor 44 that measures the speed of the engine 12 output shaft, the speed of the shaft connected to the M/G 14, the speed of the transmission 24 input shaft, the speed of the transmission 24 output shaft, and the speed of one or both of the axles connected to the wheels 16.

As a part of the control strategy or algorithm for operation of the vehicle 10, the control system 42 may make an engine 12 torque request ($\tau_e$) and/or a M/G 14 torque request ($\tau_m$), as shown in FIG. 1. The net transmission input torque ($\tau_i$) is composed of the electric motor torque and engine torque ($\tau_i = \tau_m + \tau_e$), assuming that the disconnect and launch clutches 18, 22 are locked.

In alternative embodiments, the clutch 22 may be replaced with a torque converter unit including a torque converter and a lockup clutch or bypass clutch. The torque converter has torque multiplication effects when certain rotational speed differentials exist across the torque converter. During torque multiplication, the output torque of the torque converter is larger than that of the input torque due to torque multiplication across the torque converter. Torque multiplication exists for example, when the vehicle 10 is started from rest and the input shaft to the torque converter begins to rotate, and the output shaft from the torque converter is still at rest or has just begun to rotate.

The lockup clutch or bypass clutch is used to lock out the torque converter such that the input and output torques for the downstream torque transfer device 22 are equal to one another, and the input and output rotational speeds for the device 22 are equal to one another. A locked clutch eliminates slipping and driveline inefficiency across the torque converter, for example, when the rotational speed ratio across the torque converter is greater than approximately 0.8, and may increase fuel efficiency for the vehicle 10.

Changing torque amounts and/or directions may cause disturbances or oscillation in driveline 26 associated with lash crossing. Backlash may occur in a vehicle driveline 26 whenever one of the wheel 16 torque and power plant 12, 14 torque change direction from the other. This change in torque direction may occur with the vehicle 10 operating with both the disconnect clutch 18 and the launch clutch 22, or lock out clutch for the torque converter, in a locked or engaged position. For example, when vehicle 10 is decelerating, the compression braking effect of the engine 12 provides negative torque to the transmission 24 which is then passed through the differential 28 and then to the wheels 16. At this point, the driveline 26 is wrapped in the negative direction. If the driver provides a power request, or tip in, using the accelerator pedal, the engine 12 torque switches from negative to positive as it begins to supply torque to propel the vehicle 10 forward. The driveline 26 unwraps, as each driveline component changes from transmitting negative torque to transmitting positive torque. At some point during this transition, the driveline 26 passes through a relaxed state with zero torque applied to the wheels 16.

During this zero torque region, gear teeth in the transmission 24 and/or differential 28 may not be tightly coupled with their mating gears and there may be some play in the driveline 26. Play across multiple sets of gears acts as cumulative. As the engine 12 continues to provide positive torque, the driveline 26 will wrap in the positive direction. The gears may be quickly coupled resulting in a clunk. Also, the axle connecting the differential 28 to a wheel 16 may twist slightly as a result of higher torque on the differential 28 side of the axle compared to the wheel 16 side. The axle may act as a torsional spring to store this energy. As the vehicle 10 begins to accelerate, the wheel 16 torque catches up to the torque at the differential 28, and any energy stored in the axle is released quickly causing an oscillation in the opposite direction, or backlash. The result of this backlash crossing is a clunk or noise when the gear teeth hit together, and a reduction in wheel torque when the axle energy is expended. The clunks and oscillations may be noticed by a driver depending upon their severity. For a driveline with multiple gear meshes arranged in series, each gear mesh may have a lash zone. The lash in the driveline cascades or progresses through the gear meshes. After a gear mesh is engaged, the subsequent gear mesh crosses through a lash zone as the torque reversal goes through. Backlash may include main gear lash as well as any subsequent gears.

The scenario described above can also happen in the opposite direction. In this case, the driver would be providing a power request, such as a tip in of the accelerator pedal for vehicle acceleration, and then suddenly removing the power request by releasing the accelerator pedal through a tip out. The driveshaft 26 goes from being wrapped in the positive direction to being wrapped in the negative direction, with a similar torque dip or hole and clunk during the transition. The effect of the backlash crossing due to sudden acceleration is typically more noticeable than sudden deceleration.

Figure 2:
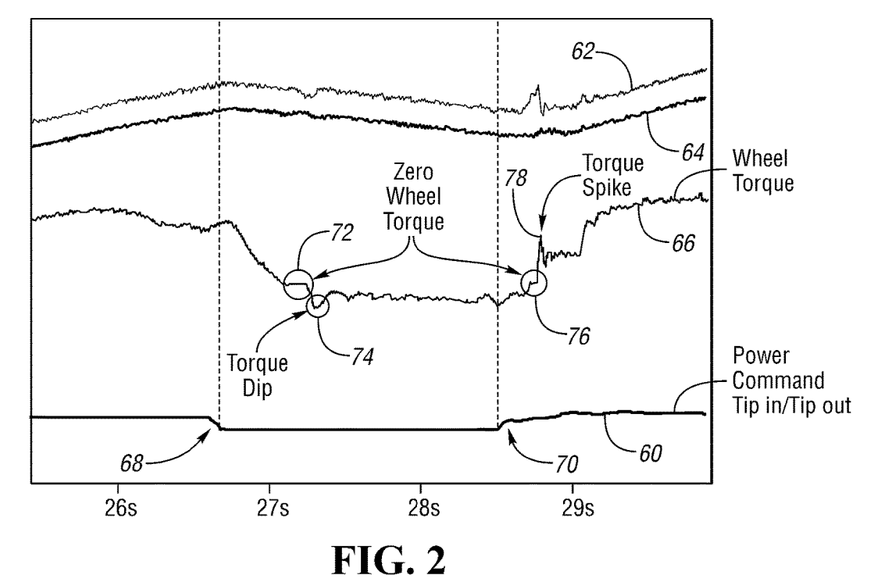
FIG. 2 is a graph illustrating an example of backlash occurring in a driveline.

Two backlash conditions for the vehicle 10 are shown graphically in FIG. 2 as an example. The accelerator pedal 60, transmission output speed 62, wheel speed 64, and wheel torque 66 are shown during a sudden deceleration at 68 and acceleration at 70. After the deceleration request at 68, transmission output speed 62 decreases faster than the wheel speed 64. This leads to the region 72 labeled "zero wheel torque", where the driveline 26 is in its relaxed state as wheel torque 66 makes a transition from positive to negative. Immediately following this transition, the wheel torque 66 decreases rapidly as the wheel speed 64 catches up to the transmission output speed 62, which leads into the region 74 labeled "torque dip". This torque dip 74 is essentially the backlash, and is caused by the energy stored in the half shaft being released and the play in the transmission 24 and other driveline components, in addition to the negative torque supplied by the transmission output. The effect of the backlash crossing 74 causes a resultant oscillation in the wheel torque.

During acceleration after a tip in request at 70, a similar scenario occurs, only in reverse. The increase in transmission output speed 62 leads to the increase in wheel speed 64, which leads into the zero torque region 76 and then a rapid torque rise or "torque spike" at 78, causing a backlash crossing effect, or a noise and oscillation which may be felt by the driver.

The control system 42 is configured to detect, sense, and/or predict the lash region to reduce or mitigate the effect of the backlash crossing. The backlash in the vehicle 10 may be sensed by observing transmission input and output torque ratio, as described below. In one example, the control system 42 detects or senses a backlash condition for the vehicle as described in U.S. Pat. No. 9,037,329 B2 issued on May 19, 2015 and incorporated by reference in its entirety herein. In other embodiments, backlash may also be sensed by using speed sensors, or other techniques as are known in the art, such as those described in U.S. Pat. No. 7,223,203 B2 issued on May 29, 2007 and incorporated by reference in its entirety herein.

Figure 3:
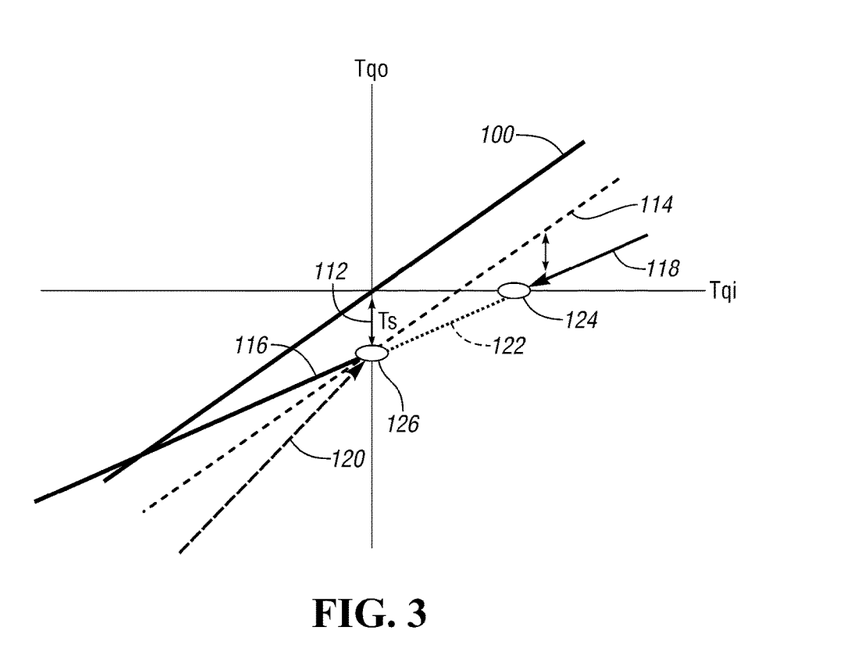
FIG. 3 is a graph illustrating a model for detecting a lash zone for a vehicle.

FIG. 3 shows the ratio of input torque to output torque across the transmission 24. An ideal or perfect transmission 24 has a perfect torque ratio as shown by line 100 crossing through zero. However, there are proportional and non-proportional losses in a real transmission 24 that should be accounted for. The losses have the effect of transposing or modifying the ideal torque ratio to an actual ratio of output torque to input torque. The actual torque ratio is the ideal torque ratio with the addition of losses. When input and output torques are both negative (generating), the transmission losses act to assist the vehicle in slowing down. When input and output torque are positive (propulsion), the losses impede propulsion effort. Line 118 represents the actual ratio during propulsion, taking losses into account. Line 120 represents the actual ratio when generating, taking losses into account. Line 122 is the range of ratios where the transmission 24 is carrying near-zero torque, and the potential for the effect of the lash zone to occur is the highest, and line 122 represents the lash region.

Region 124 represents the entry region for the lash zone from the propulsion, or positive input torque side. Region 126 represents the entry where entry region for lash from the generating, or negative input torque side. Notice that the line 122 between regions 124 and 126 is bounded by an input torque of zero (at 126) to an input torque of a positive scalar quantity (at 124), and by an output torque of a negative scalar value (at 126) to an output torque of zero (at 124). In other embodiments, other boundaries may be set to define the lash zone. By controlling input torque when the vehicle 10 is operating on line 122 as the vehicle accelerates or decelerates along it, the effects of a lash crossing event may be reduced or mitigated. The line 122 may be linear or nonlinear. For example, line 122 may be a step function with multiple steps cause by lash in each gear mesh in the driveline.

The input to output torque model for a gear ratio as illustrated in FIG. 3 may be determined as described below. During acceleration events, the driveline is in a drive configuration, such that torque from the engine 12 and/or the M/G 14 is transmitted to the wheels 16 through the transmission 24. During deceleration events, the driveline is in a driven configuration, such that torque from the wheels 16 is transmitted to the M/G 14 through the transmission 24. However, the amount of torque transmitted through the transmission 24 and driveline 26 is a function of the gear ratio and losses in the transmission 24 and driveline 26. FIG. 3 illustrates the torque, gear ratio and losses of the transmission 24 graphically. The gear ratio of the transmission 24 is equal to a ratio of the torque input ($\tau_{in}$) and torque output ($\tau_{out}$), where $\tau_{in}$ is the torque at the input shaft 46 to the transmission 24 and $\tau_{out}$ is the torque at the output shaft 48 of the transmission 24 and there are no losses in the system. The gear ratio may be based on a speed ratio, and be directly calculated directly from the numbers of teeth of the various gears that are engaged in the transmission 24. The gear ratio may also be considered an ideal torque ratio. For example, if the gear ratio is 4:1, for a +100 Nm (Newton-meter) input torque ($\tau_{in}$), the output torque ($\tau_{out}$) is 400 Nm. Therefore, the ideal torque ratio is represented by line 100 in FIG. 3 where the slope of the line is the ideal torque ratio, or the gear ratio.

A linear relationship may be used to relate torque input to torque output for a transmission, where the linear line can be described with the formula:

$$y=m*x+b$$

where y is the output torque ($\tau_{out}$) and x is the input torque ($\tau_{in}$). The slope, m, is the torque ratio output/input or the gear ratio, and b is the output torque when the input torque is zero.

Ideally, or in a transmission 24 without losses, the slope would be the ideal torque ratio and the offset is zero, as shown by line 100. The slope with no losses is the ideal torque ratio or gear ratio ($TR_{ideal}$). Therefore, the formula for the line 100 is:

$$\tau_{out}=(\tau_{in}*TR_{ideal}) \qquad \text{Equation (1)}$$

However, the transmission 24 is not perfectly efficient and has some losses. The losses in the transmission may be a function of friction, heat, spin losses or many other factors. The losses in the transmission may be characterized as 'proportional losses' and 'non-proportional losses'. Proportional losses vary as a function of the current gear and speed, whereas non-proportional losses are independent of torque. The efficiency for a transmission 24 is usually measured across the transmission 24. The driveline 26 efficiency is typically measured with the launch clutch 22 locked or the bypass clutch for a torque converter locked, or may be modeled without a torque converter.

The intercept b is equal to the non-proportional loss, $T_s$, illustrated at 112 in FIG. 2 for each gear for a step gear transmission. Line 114 illustrates the ideal torque ratio or gear ratio when accounting for non-proportional losses, $T_s$, in the transmission 24. Non-proportional losses, Ts, may be in units of output torque. The non-proportional losses, or spin losses, in the driveline may be a function of driveline output speed, driveline oil temperature, and what gear the driveline is in. The driveline output speed may be a function of driveline input speed and a gear ratio of the driveline. Therefore, the formula for line 114 is:

$$\tau_{out}=(\tau_{in}*TR_{ideal})-T_s \qquad \text{Equation (2)}$$

Proportional transmission losses should also be accounted for in the model. The actual torque ratio of the transmission 24 of $\tau_{out}$ to $\tau_{in}$ can be measured empirically in different gears. The empirical modeling of the transmission 24, without the torque converter 22 (locked, or not included), allows for representation of the 'proportional to torque' losses separate from 'non-proportional to torque' losses, which may be represented by using a linear relationship between output torque and input torque. Proportional losses may be a function of the driveline oil temperature, what gear the driveline is in, and the input torque to the driveline. Proportional losses are represented by the slope of the output to input torque relationship for each gear. The slope including proportional losses is equal to the actual torque ratio across the transmission 24.

By knowing the ideal torque ratio, or gear ratio, and torque input-output relationship and measuring only a few points of the actual torque ratio input-output relationships, the difference between the slopes of the ideal torque ratio ($TR_{ideal}$) and the actual torque ratio ($TR_{actual}$) can be determined. By subtracting off the portion of $\tau_{in}$ that comes from the difference in the slopes between the ideal torque ratio and the actual torque ratio, we can account for the proportional torque losses. Non-proportional losses are represented by $T_s$. The linear formula for the transmission when accounting for proportional and non-proportional losses, shown as line 116 in FIG. 2, could be written as:

$$\tau_{out}=(\tau_{in}*TR_{ideal})-T_s-\tau_{in}*(TR_{ideal}-TR_{actual}) \qquad \text{Equation (3A)}$$

Cancelling out the terms in the right hand side of the loss equation, the formula for line 116 in FIG. 3 may be simplified to:

$$\tau_{out}=(\tau_{in}*TR_{actual})-T_s \qquad \text{Equation (3B)}$$

For example, with a +100 Nm input torque, actual torque ratio of 4.0, ideal torque ratio of 4.1, and non-proportional loss of 5, the $\tau_{out}$ may be determined as follows. Note that the numbers are truncated for simplicity in the example.

First, using Equation (3A), the output torque is calculated as:

$$\tau_{out}=(100*4.1)-5-(100*(4.1-4.0))=395\ Nm$$

Using Equation (3B), the output torque is calculated as:

$$\tau_{out}=(100*4.0)-5=395\ Nm$$

Power can be determined multiplying torque by the speed of the shafts 46, 48, illustrated by the equation:

$$P=\tau*\omega$$

Using an input speed of 400 rad/sec, we can determine the power calculations.

$$P_{in}=100*400=40,000\ Watts$$

$$P_{out}=395*(400/4.1)=38,536\ Watts$$

The difference between the power at the transmission input 46 and the transmission output 48 is the amount of power loss because of transmission inefficiencies.

$$P_{in}-P_{out}=1,464\ Watts$$

The loss formulas in Equation (3) are generally accurate in describing the transmission including losses in a traditional powertrain. The loss formulas in Equation (3) can also accurately describe the transmission including losses in a HEV powertrain when the vehicle 10 is motoring. However, an issue arises when the vehicle 10 is putting power into the transmission output 48 and extracting it from the transmission input 46, such as during regenerative powertrain braking in a HEV. In this situation, the torque values through the driveline 26 are negative, the transmission is in a driven configuration, and the loss formulas in Equation (3) apply differently.

The issue with the loss formulas in Equation (3) during regenerative powertrain braking is illustrated by another example as shown below. For example, for negative torques, where the input torque $\tau_{in}$ is −100 Nm input torque, the actual ratio is 4.0, the ideal ratio is 4.1, and non-proportional losses ($T_s$) is 5, $\tau_{out}$ is calculated as:

$$\tau_{out}=(-100*4.1)-5-(100*(4.1-4.0))=-405\ Nm, using\ Equation\ (3A),\ or$$

$$\tau_{out}=(-100*4.0)-5=-405\ Nm,\ using\ Equation\ (3B).$$

Using an input speed of 400 rad/sec, we can determine the power calculations as:

$$P_{in}=-100*400=-40,000\ Watts$$

$$P_{out}=-405*(400/4.1)=-39,512\ Watts$$

$$P_{in}-P_{out}=P_{loss}=-488\ Watts$$

Using the standard formulas arrives at a negative loss calculation, which is not possible, as the power going into the output shaft 48 of the transmission 24 is smaller than the power coming out through the input shaft 46 of the transmission during. For this example, 40,000 Watts of regenerative energy are collected at the transmission input 46 when only 39,512 Watts of regenerative energy is going into the transmission output 48 from the wheels 16.

For modeling the torque relationship, two lines fit the data better than one line. The first line, illustrated as line 118 in FIG. 3, is for positive output torque $\tau_{out}$ and input torque $\tau_{in}$, such as when the vehicle 10 is motoring. The second line, illustrated as line 120 in FIG. 3, is for negative output torque and input torque, such as when the vehicle 10 is regenerative braking.

The non-proportional losses 112 are calculated to be the same during motoring and regeneration. Therefore, line 118 and line 120 both use the same offset term b for non-proportional torque loss $T_s$. However, during regeneration, the proportional losses are not correctly accounted for using the standard motoring equations.

The correct $\tau_{in}$ for a given $\tau_{out}$ value is correctly computed when the proportional torque losses are summed in the correct direction. The proportional loss term in Equation (3A), that is $\tau_{in}*(TR_{ideal}-TR_{actual})$, must be a positive value, regardless if the transmission is transmitting positive or negative torque. Because $\tau_{in}$ is negative during regeneration and the proportional loss expression in Equation (3A) must be positive, the ideal torque ratio needs to be less than actual torque ratio during regeneration in order to provide the correct calculation that more energy is going into the transmission output 48 than is received at the transmission input 46 during negative torque transfer.

For example, during a negative torque transmission, where the transmission input torque $\tau_{in}$ is −100 Nm, the actual torque ratio is 4.2, the ideal torque ratio, being less than the actual ratio, is 4.1, and non-proportional losses $T_s$ is 5, $\tau_{out}$ can be determined as:

$$\tau_{out}=(-100*4.1)-5-(-100*(4.1-4.2))=-425\ Nm,\\ using\ Equation\ (3A),\ or$$

$$\tau_{out}=(-100*4.2)-5=-425\ Nm,\ using\ Equation\ (3B).\\ Note\ that\ the\ previous\ loss\ of\ -405\ is\ approximately\ five\ percent\ in\ error.$$

Using an input speed of 400 rad/sec, the power may be calculated:

$$P_{in}=-100*400=-40,000\ Watts$$

$$P_{out}=-425*(400/4.1)=-41,463\ Watts$$

$$P_{in}-P_{out}=P_{loss}=1463\ Watts$$

When the output torque and input torque are both positive the actual measured slope is less than the ideal torque ratio, as seen by line 118 compared to line 114. However, when the output torque and input torque are both negative, the actual measured slope, or $TR_{actual}$ is greater than the mechanical torque ratio, or $TR_{ideal}$, as seen by line 120 compared to line 114. The actual torque ratio for negative torque is measured to be 4.2. If the measured positive torque ratio of 4.0 is used for the negative torque situation, then Equation (3) will calculate that more energy is being collected at the transmission input 46 than is being input into the transmission output 48 during regeneration (as shown by line 116 compared to line 114).

To account for the difference between the actual torque ratio and the ideal torque ratio (or gear ratio), a proportional loss coefficient C1 is calculated for each gear using the following formula:

$$C1=\tau_{in}*(TR_{ideal}-TR_{actual}) \quad\quad\quad\quad \text{Equation (4)}$$

During propulsion/motoring, or positive torque through the transmission 24, the proportional loss coefficient C1 is included in Equation (3B) to derive the loss equation as follows:

$$\tau_{out}=(\tau_{in}*(TR_{actual}-C1))-T_s \quad\quad\quad\quad \text{Equation (5)}$$

Or alternatively, Equation (5) may be rearranged to determine a $\tau_{in}$ based on a desired torque output $\tau_{out}$ during motoring as:

$$\tau_{in}=(\tau_{out}+T_s)/(TR_{ideal}-C1) \quad\quad\quad\quad \text{Equation (6)}$$

When the torque through the transmission 24 is negative, such as during a regenerative braking event, the actual torque ratio is greater than the ideal torque ratio (or gear ratio) by the same amount that the ideal torque ratio is greater than the actual torque ratio during motoring. Therefore, the sign of C1 changes during regenerative braking, but the absolute value of C1 remains the same. Therefore during negative torque transfer through the transmission, the $\tau_{in}$ based on a desired torque output $\tau_{out}$ is:

$$\tau_{in} = (\tau_{out} + T_s)/(TR_{ideal} + C1) \quad \text{Equation (7)}$$

The input to output torque relationship for the transmission 24 is therefore better characterized by two lines 118, 120 to differentiate between motoring and regeneration, or positive and negative torque. Line 120 in FIG. 3 illustrates the line accounting for proportional losses which add to regenerative braking. Line 120 may be characterized by rearranging Equation (7) as:

$$\tau_{out} = (\tau_{in} * (TR_{ideal} + C1)) - T_s \quad \text{Equation (8)}$$

The inclusion of a torque converter, pump losses, and dynamic inertia losses can be consistent across the transmission controls development process. For example, when the vehicle includes a torque converter 22, the torque input $\tau_{in}$ when the vehicle is motoring may be determined as:

$$\tau_{in} = ((\tau_{out} + T_s)/(TR_{ideal} - C1)) * (1/TR_{torque\_converter}) + Loss_{pump} + Loss_{dyn\_inertia} \quad \text{Equation (9)}$$

When the M/G 14 is generating or when the vehicle is regenerative braking such that the transmission output torque is negative, Equation (9) is modified so that the torque input $\tau_{in}$ may be determined from the following equation:

$$\tau_{in} = ((\tau_{out} + T_s)/(TR_{ideal} + C1)) * (1/TR_{torque\_converter}) Loss_{pump} + Loss_{dyn\_inertia} \quad \text{Equation (10)}$$

The torque converter 22 may be connected between the M/G 14 and the transmission 24. The torque converter 22 may also be included in the transmission 24. When the torque converter 22 is locked via locking the bypass clutch, the torque ratio of the torque converter is 1:1.

The control system 42 is configured to determine a lash zone for the vehicle 10 based on the gear of the transmission, and to use the determined lash zone during vehicle operation to predict or detect an impending lash zone, which may in turn be used in a control strategy to mitigate the effect of the driveline lash crossing.

Figure 4:
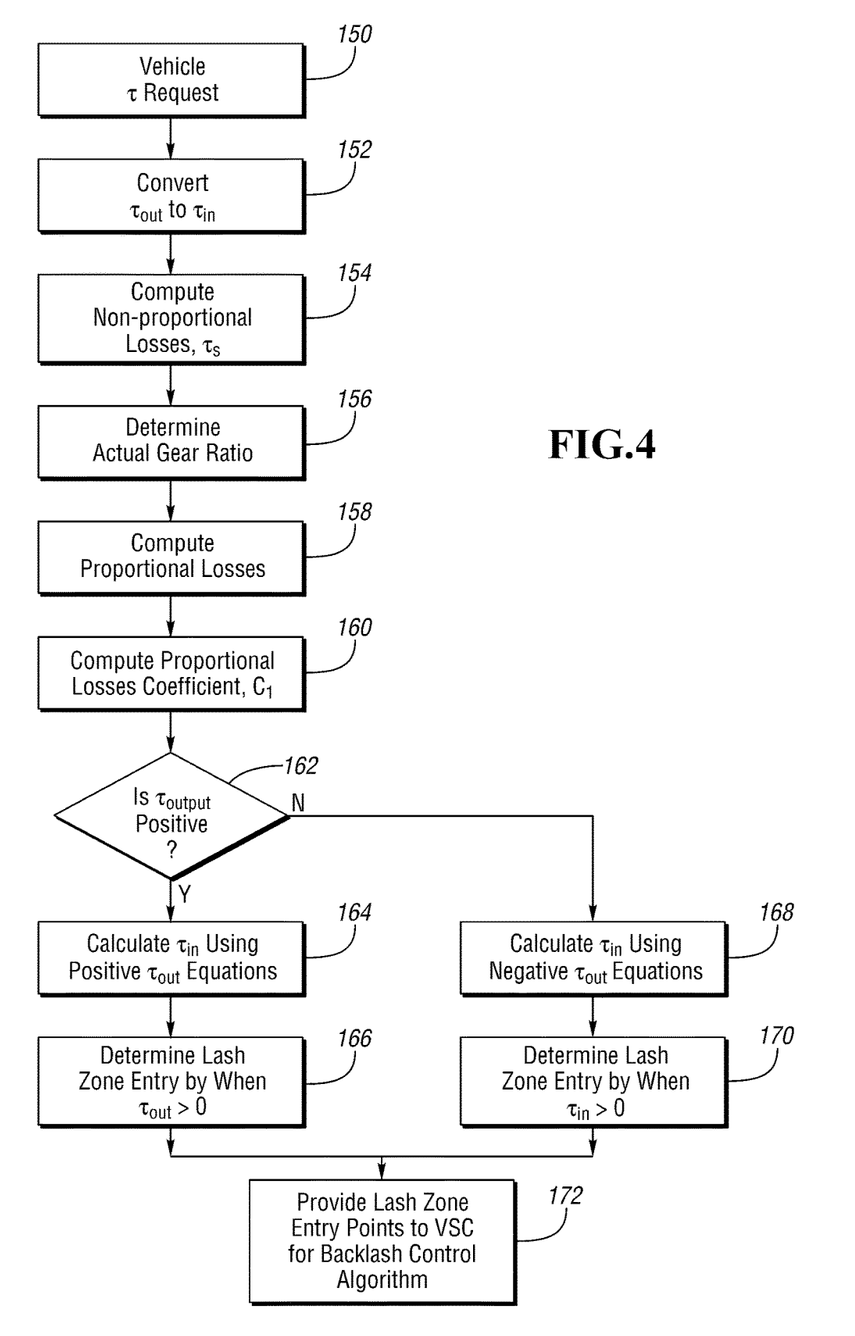
FIG. 4 is a flow chart illustrating a process for determining a lash zone according to an embodiment.

Referring to FIG. 4, first the controller 42 receives a vehicle torque request at 150, such as a torque request from the driver through a tip in or tip out event of the accelerator pedal. The vehicle torque request is a request for a wheel torque, which relates to τout. The controller 42 converts τout to τin based on the ideal torque ratio of the transmission 24, as represented by block 152.

The controller 42 determines the value for the current gear, or alternatively the actual torque ratio, as represented by block 156. The actual torque ratio may be stored in a lookup table which corresponds to the current gear, or corresponds to whether the vehicle is motoring or regenerative powertrain braking, as described above.

The actual torque ratio is used with the transmission speeds, either estimated or actual, to determine the non-proportional loss, as represented by block 154. The non-proportional loss values may be stored in a lookup table which corresponds to the current gear and is accessed or indexed by the transmission speeds, as described above when later calculating the actual torque ratio 156.

The controller 42 determines the torque proportional loss, as represented by block 158 of FIG. 4. The proportional loss values may also be stored in a lookup table with a separate set of values for each of the available gears or torque ratios, as well as negative torque values or positive torque values.

Block 160 represents determination of a proportional loss coefficient based on the currently selected gear. This factor may be used to fine-tune or calibrate the torque determination for any additional losses which may not be included in the torque loss terms described above.

The controller 42 then determines at 162 whether the torque is in a positive or negative direction through the transmission and driveline, i.e. whether the vehicle is motoring or generating/braking, or whether the driveline is in a drive configuration or driven configuration. If the vehicle 10 is motoring with the driveline in a drive configuration, or has positive torque flowing from the engine 12 and/or M/G 14 to the wheels 16, the controller 42 proceeds to 164 to calculate the $\tau_{in}$ using Equation (6). The entry point to the lash zone is calculated at block 166 by calculating the $\tau_{in}$ when $\tau_{out}$ is zero, or another designated value.

If the vehicle 10 is generating/braking with the driveline in a driven configuration, or has torque flowing from the wheels 16 to the engine 12 and/or M/G 14, the controller 42 proceeds to 168 to calculate the $\tau_{in}$ using Equation (8). The entry point to the lash zone is calculated at block 170 by calculating the $\tau_{out}$ (or torque input to the driveline or transmission) when $\tau_{in}$ is zero, or another designated value.

The lash zone entry points from 166 and 170 are used at block 172 to provide a lash zone to the control system 42 for use in a backlash crossing control algorithm or method.

Lash zone crossing control may be handled differently by a control algorithm or method based upon whether the engine 12 is off such that the vehicle 10 operates in an electric-only mode, or the engine 12 is on, such that the vehicle operates in a hybrid mode with the M/G 14 also operating. In the engine-off case, the only actuator is the M/G 14, so net transmission input torque, $\tau_{in}$, is equal to the motor torque. In the engine-on case, there are two actuators acting upon the transmission input shaft, so the net transmission input, $\tau_{in}$, is equal to the M/G 14 torque plus the engine 12 torque. Thus, only motor 14 torque is controlled in electric drive whereas both motor torque and engine torque are controlled and blended in a hybrid drive and must be considered for backlash crossing control.

The M/G 14 may provide better control crossing through the lash zone than the engine 12. The M/G 14 generally has good authority near zero torque and/or around zero or near zero speeds. The M/G 14 has a faster response time than the engine 12, which may lag due to throttle response, and the like. Additionally, the M/G 14 may have more accurate control over the amount of torque provided by it compared to the engine 12.

However, it may not be possible in all scenarios to control crossing the lash zone by controlling the M/G 14 torque to offset the torque disturbance when the vehicle 10 is operating in a hybrid drive mode. For example, it may be desirable to control the engine 12 torque when crossing the lash zone based on a state of the M/G 14, traction battery 32, or another vehicle system state. In one example, the engine 12 torque is controlled when crossing the lash zone when the state of another vehicle system is at a limit or threshold or would reach or pass a limit or threshold in crossing the lash zone, or the other vehicle system does not have the range of authority needed to mitigate backlash while crossing the lash region. According to the present disclosure, only one prime mover, e.g. the engine 12 or the M/G 14, has a torque output that is modulated while crossing the lash region while the other is held or maintained at a generally constant torque output as the combination of modulating both actuators 12, 14 may result in further torque instabilities, especially given the serial or sequential layout of the vehicle 10 powertrain and driveline.

Figure 5A:
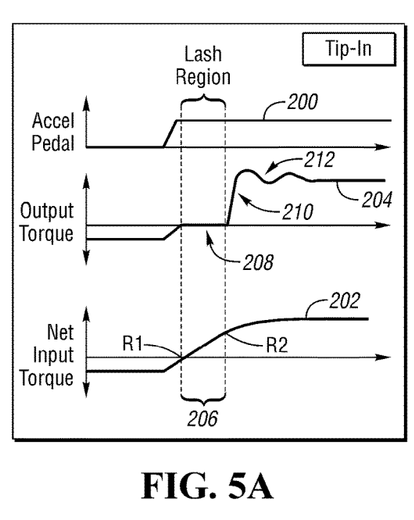
FIGS. 5A and 5B are timing charts illustrating a tip in event and a tip out event for a vehicle with no backlash crossing control.

FIGS. 5A and 5B illustrate an example of input torque and output torque during a lash crossing event with no control in place to mitigate any lash crossing effect. In the tip-in case in FIG. 5A, a command for tip-in is shown at 200. The input and output torques 202, 204 are going from a negative value, i.e. charging, regeneration or cruise, to a positive value with propulsion or motoring. As the net input torque 202 goes through the lash 206 region from R1 to R2, the gears in the transmission and driveline are relaxed and torque does not increase linearly at the output as shown by 208. When R2 is reached at the end of the lash zone 206, the gears mesh suddenly, causing a surge in output torque at 210. The surge winds the driveline up like a spring, and then the spring energy is released causing a resulting oscillation at 212.

Figure 5B:
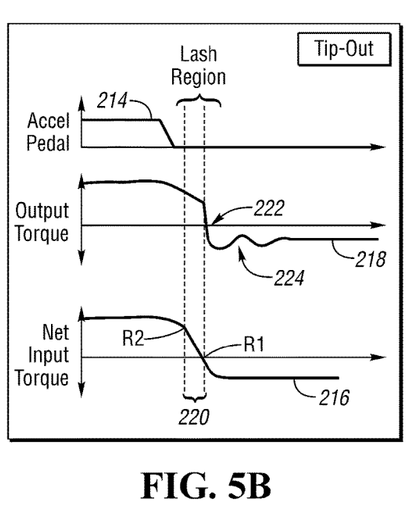

A similar phenomenon happens during the tip-out case shown in FIG. 5B with no lash crossing control. During tip-out as shown by a tip out command on line 214, the input and output torques 216, 218 go from positive, i.e. propulsion or motoring, to negative, i.e. charging or regeneration. As the net input torque 216 goes through the lash 220 region from R1 to R2, the gears in the transmission and driveline are relaxed. When R1 is reached at the end of the lash zone 220, the gears mesh suddenly, causing a downward surge in output torque at 222. The surge winds the driveline up like a spring in the opposite direction compared to FIG. 5A, and then the spring energy is released causing a resulting oscillation at 224.

Figure 6A:
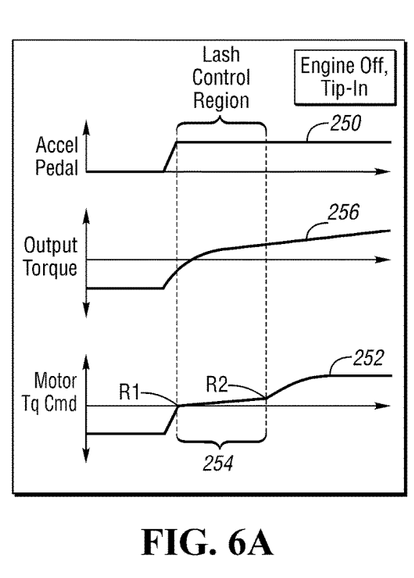
FIGS. 6A and 6B are timing charts illustrating a tip in event and a tip out event for a vehicle in electric only operation with backlash crossing control.
Figure 6B:
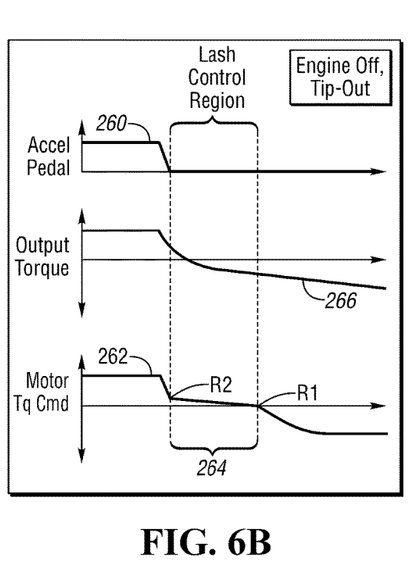

FIGS. 6A and 6B show a lash crossing event while the engine 12 is off such that the vehicle 10 is operating in an electric mode, with motor 14 torque control used to mitigate the lash event in a tip in case in FIG. 6A and a tip out case in FIG. 6B. The net input torque to the transmission 24 is equal to the motor 14 torque since the engine 12 is off. The engine 12 may be disconnected with the disconnect clutch 18 opened. The clutch 22 may be at least particularly engaged or locked, or may be open if used in combination with a torque converter. During the tip-in event at 250 in FIG. 6A, the motor torque 252 rises quickly as driver demand increases until input torque point R1 is reached. From R1 to R2, within the lash zone 254, the motor torque 252 is increased slowly as a ramp or filter function until net input torque reaches R2. Although motor torque 252 is shown as a line across 254, the motor torque 252 may be modulated to any desired profile, and in one embodiment is provided from a two dimensional look up table with a tailored response for the vehicle.

After the lash region 254, normal torque control is resumed, with a fast ramp or filter to bring the torque 252 up to driver demand in a smooth fashion. By controlling the rise or charge in input torque 252 through the lash region 254, the transmission 24 is walked through its relaxed state, which slowly brings the gear teeth in one or more gear meshes together from the relaxed state, and little or no clunk occurs, as shown by the output torque 256. Once the gear teeth are meshed at R2, more motor torque 252 may be applied without a harsh event and the resulting harsh oscillation.

A similar type of control crossing through a lash region is used in the tip-out case in FIG. 6B. After a tip out event at 260, the motor torque 262 is reduced quickly to meet driver demand or charge/regeneration demand until point R2 is reached. From R2 to R1, within the lash zone 264, the torque 262 is controlled in a slow ramp or filter function until point R1 is reached. The motor torque 262 may be controlled to any profile through the lash region 264. In one embodiment, the motor torque 262 is rapidly decreased by a large amount before the lash zone 264, and is reduced by a much smaller amount through the lash zone to control and reduce lash in the driveline. At point R1, the gear teeth are meshed, and more motor torque 262 may be applied in the negative direction without a harsh event or oscillation, as shown by the smooth output torque 266.

Figure 7A:
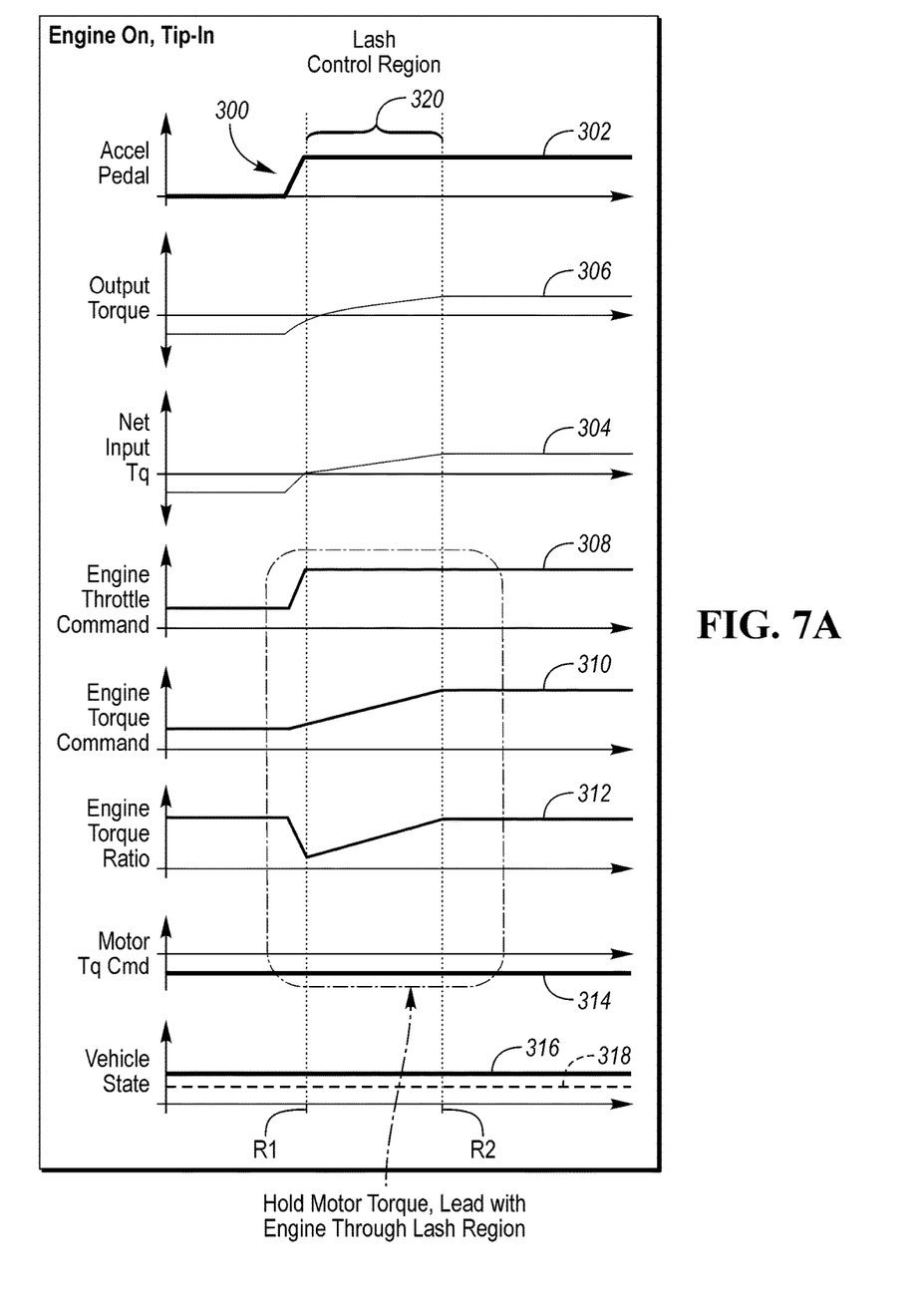
FIGS. 7A and 7B are timing charts illustrating a tip in event and a tip out event for a vehicle in hybrid operation with backlash crossing control.
Figure 7B:
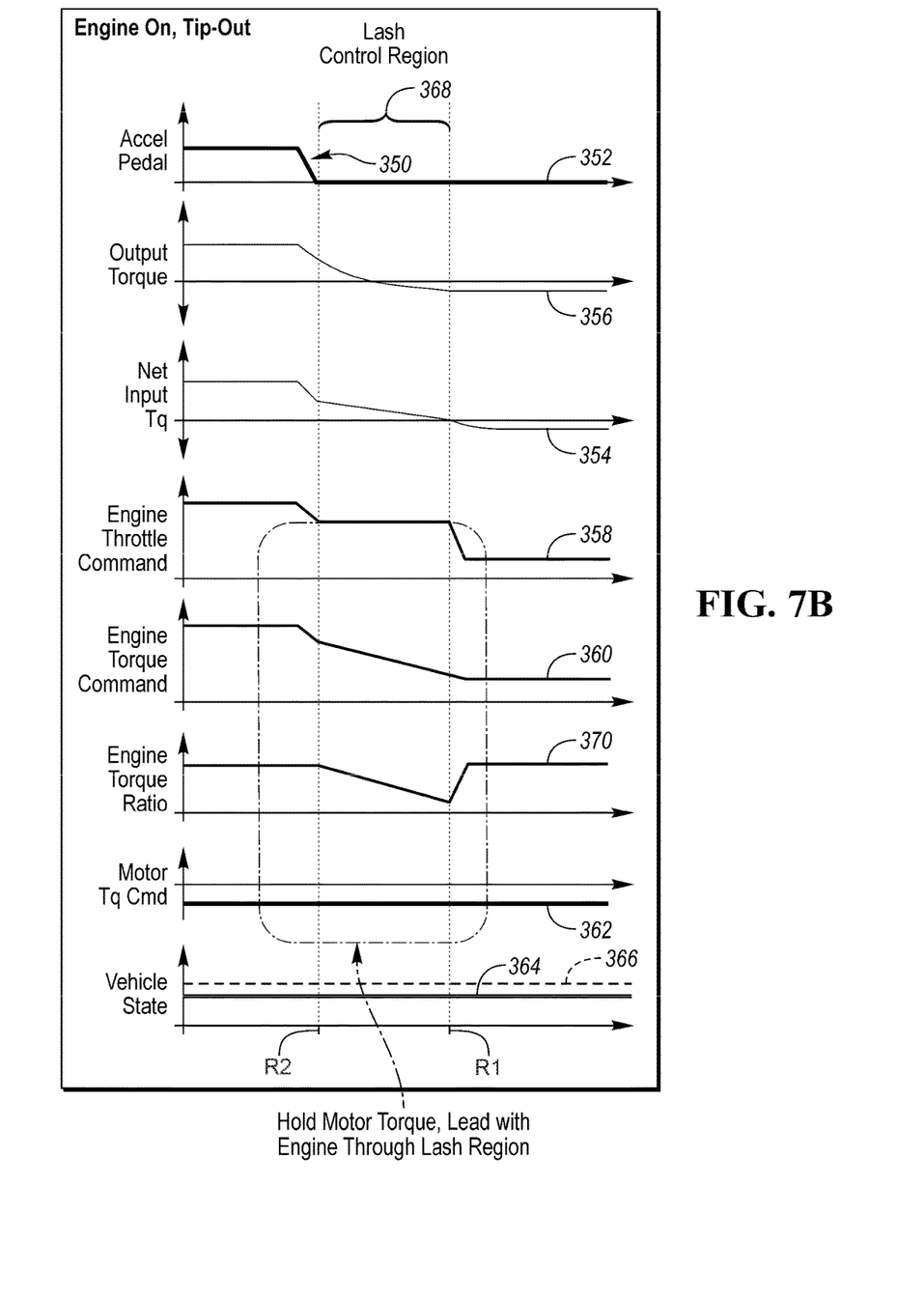

FIGS. 7A and 7B show a lash crossing event while the engine 12 is on and the vehicle 10 is operating in a hybrid mode. In this case, the net input torque is equal to the motor 14 torque plus the engine 12 torque. Thus, it is necessary to control both motor 14 and engine 12 torque to mitigate a lash crossing event. The upstream clutch 18 is at least partially engaged or locked. The downstream clutch 22 may be at least partially engaged or locked, or may be open if used with a torque converter.

In one example of the present disclosure, the M/G 14, battery 32, or another associated vehicle system is operating at a threshold or limit or within a specified offset or range of a threshold or limit, or does not have sufficient range of authority to mitigate backlash while crossing the lash zone. The threshold or limit may be based on battery 32 temperature, a battery 32 state of charge, a M/G 14 coil temperature, a M/G 14 speed, an electrical current delivery limit, an IRMS current limit, for example. As such, the M/G 14 may no longer be used to control the torque during the lash crossing as it is either operating at a limit for the M/G 14 or an associated system, or controlling the M/G 14 torque through the lash region would cause the M/G 14 or an associated system to reach or cross the threshold or limit or be within a specified offset of the limit. In one embodiment, if the M/G 14, battery 32, or another associated vehicle system is not operating at a threshold or limit or within a specified offset or range of a threshold or limit, the control system 42 may implement a control strategy as described in U.S. Pat. No. 8,954,215 B2, issued on Feb. 10, 2015, and incorporated by reference in its entirety herein where the M/G 14 torque is controlled to generally lead through the lash region and the engine 12 torque is generally held as the M/G 14 has a faster response time and more accurate control over the torque provided. The engine 12 torque is commanded to a constant or generally constant value while the motor 14 torque is modulated to achieve the desired effect in net transmission input torque. During the lash region of R1 to R2, the motor torque response leads the engine torque response in both the tip-in and tip-out cases.

In another example according to the present disclosure, the M/G 14, battery 32, or another associated vehicle system is operating far from a threshold or limit, at or within a specified offset or range of a threshold or limit; however, the M/G 14 torque is held to a generally constant value and not modulated through the lash region, and the engine torque is modulated to achieve the desired effect in net transmission input torque. Therefore, the engine 12 torque is controlled to generally lead through the lash region, and the M/G 14 torque is generally held to a constant or generally constant value. The engine 12 "fast" torque may be modulated or controlled, as described below.

The engine 12 torque output may be controlled via two pathways, a fast torque path and a slow torque path. The engine 12 torque may be controlled via a fast torque pathway via spark retard, control over fuel delivery, e.g. fuel cutout, injector timing control, valve timing control, or other controls over the engine operation that provide a rapid engine torque response. The engine 12 torque may be controlled via a slow torque pathway via control over the air flow into the engine, for example, by controlling the throttle or manifold.

In FIGS. 7A and 7B, the engine 12 torque generally leads through the lash region and the motor 14 torque is generally held. The motor 14 torque is commanded to a constant or generally constant value while the engine 12 torque is modulated or varied to achieve the desired effect in net transmission input torque. During the lash region of R1 to R2, the engine 12 torque response leads the motor 14 torque response in both the tip-in and tip-out cases.

A tip-in event at 300 is shown in FIG. 7A for the accelerator pedal position signal 302. To meet the driver demand, the net input torque 304 to the transmission needs to increase, which in turn increases the output torque 306 to meet the driver demand at the accelerator pedal 302. The engine throttle command 308 is increased or ramped up based on the tip in event 300, and the engine torque command 310 is also increased prior to the net input torque 304 reaching input torque point R1. The engine throttle command 308 also represents an overall engine torque output if no fast torque control strategy, as shown via line 310, were to be used. The engine torque 310 is held back compared to the engine throttle command 308 via a fast torque control path, such as a spark retard or fuel control. Note that the engine torque ratio 312 drops as the engine throttle command 308 and torque command 310 are increased prior to R1. The M/G 14 torque command 314 is held to a constant value as R1 is approached. In the present example, the M/G may be at or near a limited operating state based on a state of the motor, or another electrical or other vehicle system such that the M/G 14 is not modulated to control the net input torque 304. A vehicle state 316 is illustrated as being within a predetermined offset of a limit or threshold 318. The vehicle state 316 in the example may be a battery state of charge or another state with a lower threshold that causes motor 14 torque control to be limited or unavailable. Alternatively, the M/G 14 or other electrical or vehicle system is not at or near a limited operating state and is held to a constant torque output while the engine 12 is controlled and modulated to have only one actuator for better control of the vehicle powertrain and driveline as the vehicle approaches and cross through the lash region.

The lash region 320 extends between R1 and R2. As the lash region 320 is entered, the engine torque command 310 is modulated or slowly ramped via the fast torque control strategy through the lash region 320, as shown in FIG. 7A, until the lash region is crossed at R2 is reached. From R1 to R2, within the lash zone 320, the motor torque 314 is commanded to be generally constant and the engine torque 310 is increased slowly to control the torque across the lash zone until net input torque reaches R2 and the gear teeth are smoothly meshed. Of course, the engine torque 310 may be commanded to other profiles to control torque through the lash zone 320. After the lash zone 320, normal torque control is resumed and the engine 12 and/or the M/G 14 torque output may be controlled such that the input torque 304 meets the driver torque demand or output torque 306. In the present example, engine torque 310 meets driver demand such that the motor torque 314 remains constant. In other examples, the motor 14 torque may be controlled after the lash zone 320 to meet driver demand. Notice that the output torque 306 does not have any noticeable backlash using the control method as described.

A tip-out event 350, illustrated in FIG. 7B, for the accelerator pedal position signal 352. To meet the driver demand, the net input torque 354 to the transmission needs to decrease, which in turn decreases the output torque 356 to meet the driver demand via the accelerator pedal 352. The engine throttle command 358 is decreased or ramped down based on the tip out event 350, and the engine torque command 360 is also decreased prior to the net input torque 354 reaching input torque point R2. The engine throttle command 358 also represents an overall engine torque output if no fast torque control strategy were to be used. The M/G 14 torque command 362 is held to a constant value as R2 is approached. In the present example, the M/G 14 may be at or near a limited operating state based on a state of the motor, or another electrical or other vehicle system such that the M/G 14 is held constant and not modulated to control the net input torque 354. A vehicle state 364 is illustrated as being within a predetermined offset of a limit or threshold 366. The vehicle state in the example may be a net motor speed, a battery temperature, a motor temperature, or another state with an upper threshold that causes motor 14 torque control to be limited or unavailable. Alternatively, the M/G 14 or other electrical or vehicle system is not at or near a limited operating state and is held to a constant torque output while the engine 12 is controlled and modulated to have only one actuator for better control of the vehicle powertrain and driveline as the vehicle approaches and cross through the lash region.

The lash region 368 extends between R2 and R1. As the lash region 368 is entered, the engine throttle command 358 is held to a constant value, and the engine torque command 360 is modulated or slowly ramped via the fast torque control strategy through the lash region 368, as shown in FIG. 7B, until the lash region is crossed at R1 is reached. From R2 to R1, within the lash zone 368, the motor torque 362 is commanded to be generally constant and the engine torque 360 is decreased slowly to control the torque across the lash zone until net input torque 354 reaches R1 and the gear teeth are smoothly meshed. Of course, the engine torque 360 may be commanded to other profiles to control torque through the lash zone 368. Note that the engine torque ratio 370 drops as the engine torque command 360 decreases through the lash zone 368, and then increases as the engine throttle command 358 decreases after the lash zone 368 or after R1. After the lash zone 368, the engine throttle 358 is commanded to decrease, and normal torque control is resumed and the engine 12 and/or the M/G 14 torque output may be controlled such that the input torque 354 meets the driver torque demand or output torque 356. In the present example, engine torque 360 meets driver demand such that the motor torque 362 remains constant. In other examples, the motor 14 torque may be controlled after the lash zone 368 to meet driver demand. Notice that the output torque 356 does not have any noticeable backlash using the control method as described.

Figure 8A:
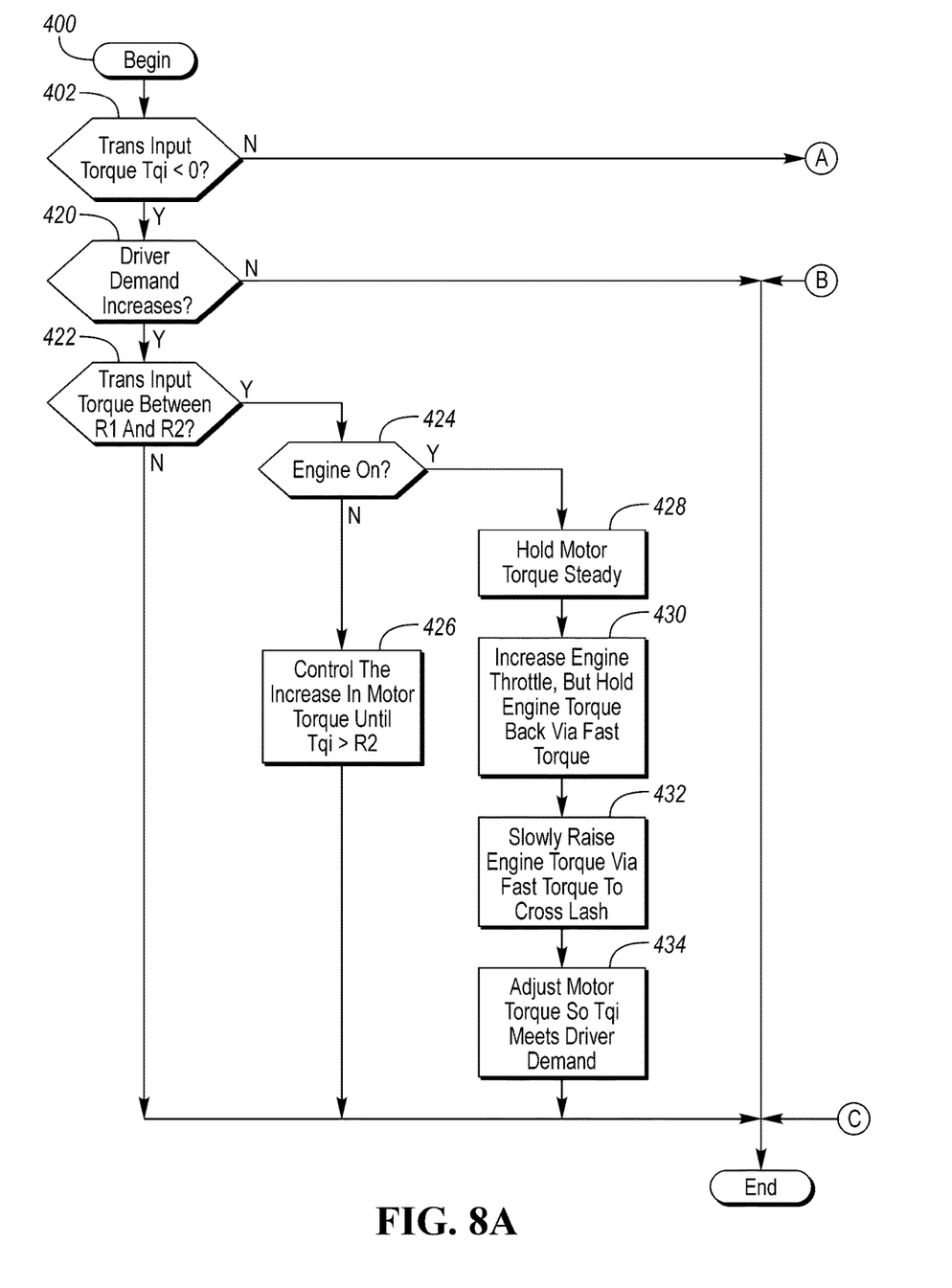
FIGS. 8A and 8B are a flow chart illustrating a process for controlling the effect of backlash crossing in a vehicle.
Figure 8B:
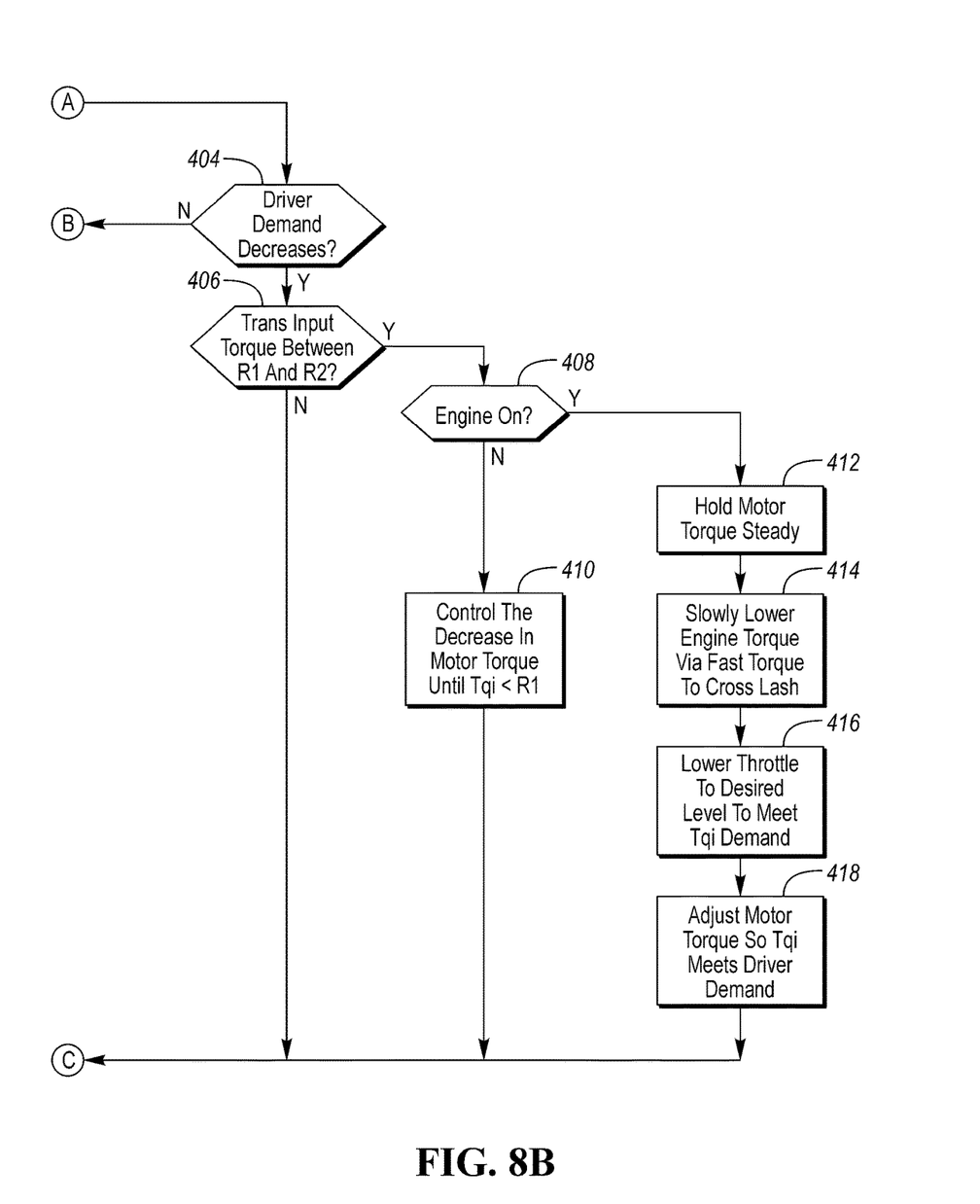

The lash zone crossing control method is shown as a flowchart in FIG. 8. Note that in other embodiments, the method may have greater or fewer steps, and the steps may be performed in another order. The portion of the flowchart in FIG. 8A generally shows operation when driver demand is increasing, or tip in conditions, and of the portion of the flowchart in FIG. 8B generally shows the operation while driver demand is decreasing, or tip out conditions.

The controller or control system 42 for the vehicle 10 begins at block 400, and proceeds to block 402 where it determines if the input torque, $\tau_{in}$, is positive or negative. If the input torque is positive, the controller 42 proceeds to 404, where it determines if driver demand is decreasing, such as through a tip out event, an example of which is shown in FIG. 7B. If driver demand is decreasing at 404, the controller 42 monitors the transmission input torque compared to the lash zone. If the transmission input torque enters the lash zone at 406, the controller 42 determines if the engine 12 is operating and providing torque at 408. If the engine 12 is not operating, which correlates to an electric only mode of operation for the vehicle, the controller 42 controls the decrease in motor 14 torque until the lash zone is exited at 410. If the engine 12 is operating at 408, correlating to a hybrid mode of operation for the vehicle, the controller 42 proceeds to block 412 and holds the motor 14 torque output constant or maintains it to a steady value, and slowly lowers the engine 12 torque output via a fast torque control strategy at 414 until the lash zone is crossed. The controller 42 then lowers the engine 12 throttle to a desired level such that the input torque corresponding to the requested output torque is met at 416, and then adjusts, controls, or modulates the motor 14 torque and/or engine 12 torque at 418 such that the input torque meets the driver torque demand.

If the input torque at 402 is negative, the controller 42 proceeds to 420, where it determines if driver demand is increasing, such as through a tip in event, an example of which is shown in FIG. 7A. If driver demand is increasing at 420, the controller 42 monitors the transmission input torque compared to the lash zone. If the transmission input torque enters the lash zone at 422, the controller 42 determines if the engine 12 is operating and providing torque at 424. If the engine 12 is not operating, which correlates to an electric only mode of operation for the vehicle, the controller 42 controls the increase in motor 14 torque until the lash zone is exited at 426. If the engine 12 is operating at 424, correlating to a hybrid mode of operation for the vehicle, the controller 42 proceeds to block 428 and holds the motor 14 torque output constant or to a steady value. The controller 42 increases or opens the engine 12 throttle and holds back the engine torque output via a fast torque control strategy at 430, then slowly increases the engine 12 torque via the fast torque control strategy at 432 until the lash zone is crossed. The controller 42 then adjusts, controls, or modulates the motor 14 torque and/or engine 12 torque at 434 such that the input torque meets the driver torque demand.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A vehicle comprising:
an engine;
a traction motor connected to the engine by an upstream clutch;
a driveline connected to a vehicle wheel, the driveline connected to the traction motor by a downstream clutch; and
a controller configured to limit a rate of change of a torque applied to a component of the driveline when the upstream and downstream clutches are locked by controlling engine torque through a region surrounding a torque reversal of a driveline output torque while maintaining motor torque at a constant value through the region, controlling a driveline input torque during the torque reversal of the driveline output torque to limit a rate of change of the driveline output torque, and controlling the engine torque during a torque reversal of the component of the driveline, the region defined as a function of the driveline input torque, the driveline output torque, nonproportional driveline losses, and an actual torque ratio across the driveline.

2. The vehicle of claim 1 wherein the controller is configured to control the engine torque through the region via a fast torque control path.

3. The vehicle of claim 1 wherein the controller is configured to control the engine torque through the region via spark retard.

4. The vehicle of claim 1 wherein the controller is further configured to maintain the motor torque at the constant value through the region to prevent a parameter of a vehicle component from reaching a predetermined threshold value.

5. The vehicle of claim 4 wherein the parameter comprises one of a speed of the motor, an electrical current of the motor, a traction battery state of charge, a traction battery temperature, and a motor temperature.

6. The vehicle of claim 1 wherein the torque reversal of the driveline output torque is from negative to positive torque; and
wherein the controller is configured to control the engine torque by at least partially opening a throttle valve prior to the region, maintaining the throttle valve position through the region, and increasing the engine torque via fast torque control path through the region.

7. The vehicle of claim 6 wherein the torque reversal of the driveline output torque from negative to positive torque is in response to an accelerator pedal tip in.

8. The vehicle of claim 1 wherein, when the torque reversal of the driveline output torque is from positive to negative torque
the controller is configured to control the engine torque by maintaining a throttle valve position through the region, decreasing the engine torque via fast torque control path through the region, and at least partially closing the throttle valve after the region.

9. The vehicle of claim 8 wherein the torque reversal of the driveline output torque from positive to negative torque is in response to an accelerator pedal tip out.

10. The vehicle of claim 1 wherein the downstream clutch is a bypass clutch for a torque converter.

11. A method of controlling a hybrid vehicle comprising controlling engine torque to a specified profile by varying engine torque via a fast torque control path with an unchanging throttle position and maintaining motor torque at a generally constant value during at least one of wheel torque and driveline component torque reversals to limit a vehicle output torque rate of change through a lash region associated with a range of driveline torque ratios.

12. A vehicle comprising:
an engine;
a traction motor connected to the engine by an upstream clutch;
a driveline connected to a vehicle wheel, the driveline connected to the traction motor by a downstream clutch; and
a controller configured to limit a rate of change of a torque applied to a component of the driveline when the upstream and downstream clutches are locked by controlling engine torque through a region surrounding a torque reversal of a driveline output torque, controlling a driveline input torque during the torque reversal of the driveline output torque to limit a rate of change of the driveline output torque, and controlling the engine torque during a torque reversal of the component of the driveline, the region defined as a function of the driveline input torque, the driveline output torque, nonproportional driveline losses, and an actual torque ratio across the driveline;

wherein, in response to the torque reversal of the driveline output torque being from negative to positive torque, the controller is further configured to control the engine torque by at least partially opening a throttle valve prior to the region, maintaining the throttle valve position through the region, and increasing the engine torque via fast torque control path through the region.

13. The vehicle of claim 12 wherein the torque reversal of the driveline output torque from negative to positive torque is in response to an accelerator pedal tip in.

14. The vehicle of claim 12 wherein, in response to the torque reversal of the driveline output torque being from positive to negative torque, the controller is further configured to control the engine torque by maintaining a throttle valve position through the region, decreasing the engine torque via fast torque control path through the region, and at least partially closing the throttle valve after the region.

15. The vehicle of claim 12 wherein the torque reversal of the driveline output torque from positive to negative torque is in response to an accelerator pedal tip out.

* * * * *